Patented Aug. 15, 1950

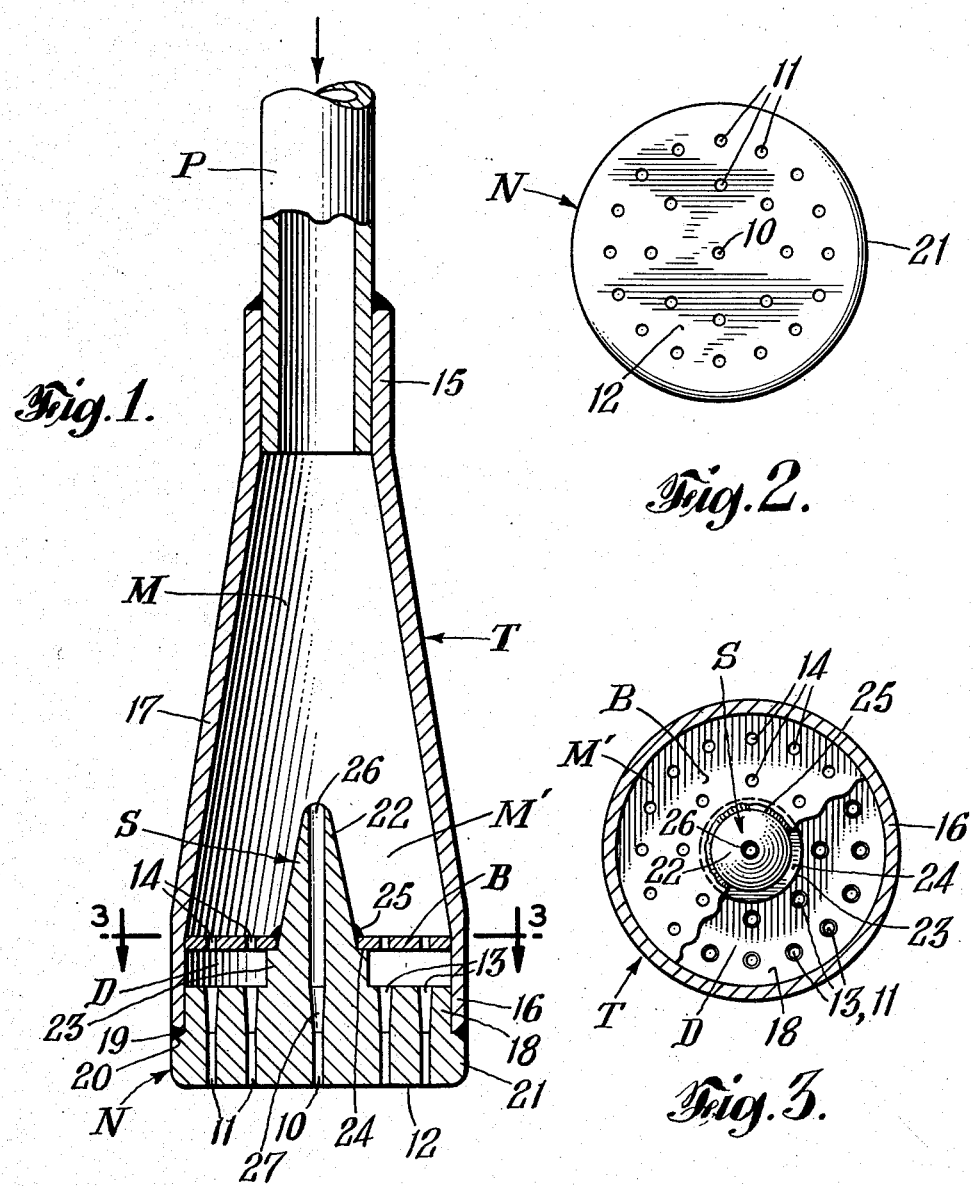

2,518,544

UNITED STATES PATENT OFFICE 2,518,544

MULTIFLAME HEATING HEAD

Clifford C. Anthes, Union, N. J., assignor to The Linde Air Products Company, a corporation of Ohio Application November 15, 1947, Serial No. 786,299

5 Claims. (Cl. 158—27.4)

1

This invention relates to heating heads; more particularly to multi-flame heating heads or nozzles of large diameter and suitable for use in heating large areas of comparatively thick metal plates.

Investigation of the heating action of large-diameter multi-frame heating heads heretofore in use has demonstrated that the velocity of the flames produced by such heads is too high and of such a character that the work surface is easily scorched if the heating head is not moved over such work surface rapidly to avoid overheating and consequent damage to the metal. Furthermore, it has been learned that such prior large-diameter multi-frame heating heads are quite susceptible to flashback.

The principal object of this invention is to provide an efficient large-diameter, multi-flame heating head or nozzle capable of producing a large number of stable flames of substantially equal intensity for applying heat uniformly against a considerable surface area of a relatively thick metal workpiece without scorching the work surface.

Another object of this invention is to provide a large pattern, multi-flame heating head having excellent flashback resistance, which is a feature of prime importance for uniform heat distribution over a large area.

The objects and novel features of this invention will be apparent from the following description when considered in conjunction with the accompanying drawings in which:

Fig. 1 is a central longitudinal sectional view of a large-diameter, multi-flame heating head embodying the principles of this invention;

Fig. 2 is a front end view of the heating head, showing the arrangement of the gas discharge ports; and Fig. 3 is a sectional view taken on line 3—3 of Fig. 1, showing a portion of the baffle plate broken away.

As illustrated by the drawings, the improved heating head comprises a nozzle member N having a single central combustible mixture discharge port 10 arranged coaxially with the central longitudinal axis of the heating head and two circular rows of combustible mixture discharge ports 11 arranged parallel and concentrically relatively to the central port 10, all the ports having their outlet orifices in the plain front face 12 of the nozzle N to discharge a plurality of gas jets into the atmosphere and produce a multi-jet flame of large pattern and uniform intensity. The entrance end 13 of each of

2 the discharge ports 11 opens directly into a distributing chamber D and may be tapered to facilitate free flow of gas into the ports 11 and to resist flame propagation back into the annular gas-distributing chamber D that supplies gas to the entrances 13 of the ports 11.

The combustible gas mixture is discharged into the chamber D through two concentric rows of ports 14 in an annular baffle plate B. The inlet ends of the ports 14 in the baffle plate B open directly into a mixing and distributing chamber M in a tube T which is attachable at its inlet end to the outlet pipe P of a blowpipe or other suitable device (not shown) wherein the gases, such as oxygen and acetylene, are initially mixed to provide the combustible gas mixture to be supplied to the heating head.

The tube T has a rear cylindrical inlet section 15, a front cylindrical section 16 of larger diameter than the section 15, and an intermediate truncated conical section 17 integrally connected to the sections 15 and 16, thereby providing the forwardly flaring mixing and distributing chamber M in the tube T.

The rear end of the nozzle N has a secton 18 of reduced diameter that fits tightly into the front section 16 of the tube T. The periphery of the nozzle N is secured gas-tightly to the front end of the tube T by a circumferential weld 19 along a shoulder 20 between the smaller diameter nozzle section 18 and the larger diameter nozzle section 21. The tube section 16 and the nozzle section 21 desirably have the same outside diameter dimension. Thus, the tube T surrounds or encloses both the first gas chamber M and the second gas chamber D; the nozzle N provides a wall of the second gas chamber D; and the baffle plate B provides a wall between and common to the chamber M and the chamber D.

A boss S, preferably integral with the nozzle N and in the form of a cone 22 mounted on a cylindrical base 23, is arranged coaxially with the central longitudinal axis of the nozzle N and extends inwardly from the rear side of the nozzle and a substantial distance axially into the mixing chamber M. The diameter of the base 23 of the boss S is smaller than that of the inner circle of ports 11, and is larger than the bottom of the cone 22 to provide an annular shoulder 24 on the boss S. The inner edge of the baffle plate B is supported on the shoulder 24 and is welded to the cone 22 by an annular weld 25, to position the baffle plate B in a plane perpendicular to the axis common the nozzle N and the chambers M and D. The outer edge of the baffle plate B fits tightly against the inside of the tube section 16 adjacent the junction of the latter to the tube section 17. The baffle ports 14 communicate directly with an annular portion M' of the mixing chamber M and are arranged in axial alignment with the entrances 13 of the corresponding discharge gas ports 11 in the nozzle N. The baffle B and its ports serve to evenly distribute, and reduce any turbulence that may be present in, the gas flowing from the mixing chamber M to the distributing chamber D thereby assuring better-shaped, larger, more stable flames at the discharge orifices of ports 11. To further improve the character of the flames, the baffle ports 14 desirably are of smaller diameter than the entrances 13 of the nozzle ports 11 and the latter are tapered part way toward their discharge orifices.

Gas is supplied directly from a point well upstream in the mixing chamber M to the central nozzle port 10 by a gas passage 26 of larger diameter than the port 10. The passage 26 extends axially through the boss S and is connected to the entrance of the port 10 by a forwardly tapering passage portion 27 in the nozzle section 18. The central port 10 and its supply passage 26, 27, as disclosed, contribute to a better flame stability and greater flashback resistance. Also, the cone 22 has its inner most end rounded which, in conjunction with the larger supply passage 26, reduces turbulence and streamlines the gas approaching the baffle ports 14 and the nozzle ports, thus providing better flashback resistance while affording rapid heat transfer because of the excellent flame stability.

The arrangement of the central port 10 and its independent gas supply passages 26, 27, supplied directly from the first gas chamber M, in cooperation with the concentric rows of ports 11 supplied directly from the second gas chamber D, is decidedly advantageous because all the flames are better shaped, larger and more stable, and can be efficiently maintained at a lower flame velocity to produce a comparatively soft composite flame of large and uniform heating pattern, which results in a desirable and efficient "soaking" heat application that will not scorch the work surface. Moreover, it has been demonstrated that heating operations can be performed more economically because of the faster heat transfer and superior flashback resistance obtainable with the improved heating head of this invention.

What is claimed is:

1. A multi-flame heating head comprising a tube enclosing a first gas chamber and a second gas chamber; a nozzle having its periphery secured gas-tightly to the front end of said tube and providing a wall of said second gas chamber, said nozzle having a group of gas discharge ports leading from said second gas chamber to the atmosphere and a central gas discharge port opening into the atmosphere; a baffle providing a wall between and common to said first chamber and said second chamber, said baffle having ports extending therethrough and connecting such chambers; and a boss secured to said nozzle and extending axially rearwardly therefrom through said second chamber and a substantial distance rearwardly of said baffle and into said first chamber, said boss cooperating with said tube to provide an annular gas chamber portion adjacent and upstream of the connecting ports in said baffle, said boss having a gas passageway extending axially therethrough and communicating with said central gas discharge port in said nozzle, said passageway having a gas inlet in said first chamber upstream of said annular chamber portion.

2. A multi-flame heating head as claimed in claim 1 and wherein said boss has a cylindrical portion between said nozzle and said baffle and has a rearwardly-tapering conical portion within said first gas chamber.

3. A multi-flame heating head as claimed in claim 1 and wherein said boss has a cylindrical portion secured to said nozzle and has a conical portion whose base is secured to said cylindrical portion, and wherein said baffle is disposed in a plane perpendicular to the axis of said boss and is secured to said boss adjacent the junction of said cylindrical portion and said base.

4. A multi-flame heating head as claimed in claim 1 and wherein each of said gas discharge ports in said nozzle, including said central gas discharge port, has a portion thereof adjacent its inlet tapering toward its outlet, and wherein said passageway in said boss has a larger diameter than the outlet of said central gas discharge port.

5. A multi-flame heating head as claimed in claim 1 and wherein said tube has a cylindrical portion at its front end and also has a forwardly flaring portion secured to said cylindrical portion of said tube, said nozzle has a rear cylindrical portion of reduced diameter secured gas-tightly within said cylindrical portion of said tube, and said baffle is annular and has its outer edge tightly fitting against the inside of said tube adjacent the junction of the flaring and cylindrical portions of said tube.

CLIFFORD C. ANTHES.

REFERENCES CITED

The following references are of record in the file of this patent:

UNITED STATES PATENTS

| Number | Name | Date |
|---|---|---|
| 1,536,631 | Reinecke | May 5, 1925 |
| 1,909,496 | McKee | May 16, 1933 |
| 1,943,859 | Fisher | Jan. 16, 1934 |
| 2,143,128 | Machlet | Jan. 10, 1939 |

FOREIGN PATENTS

| Number | Country | Date |
|---|---|---|
| 627,024 | Germany | Mar. 6, 1936 |